Patented Aug. 11, 1942

2,292,468

UNITED STATES PATENT OFFICE 2,292,468

FINISHING COMPOSITION

Edmund F. Oeffinger, Milltown, N. J., and Larry G. Stauffer, Drexel Hill, Pa., assignors to E. I. du Pont de Nemours & Company, Wilmington, Del., a corporation of Delaware No Drawing. Application November 13, 1939, Serial No. 304,266

3 Claims. (Cl. 260—42)

This invention relates to finishing systems in general and more particularly to a decorative and protective finishing system for wood surfaces.

The finishing of wood surfaces such as furniture with protective and decorative coatings is carried out in a variety of ways in the present state of the art. The system used in finishing such surfaces comprises the steps of (1) staining, (2) filling, (3) sealing, and (4) varnishing. The varnish according to present practice is usually sprayed onto the surface and from 1 to 3 applications are made, depending largely on the type and quality of the article being finished. Each application or coating is dried at room temperature for usually from 18-48 hours before the application of a subsequent coating. The oleoresinous varnish used is prepared from treated drying oils and natural or synthetic resins. Cellulose derivative lacquers chiefly those of a cellulose nitrate base have displaced to some extent the oleoresinous varnishes as the finishing coating. In using these lacquers usually more coatings are necessary to give the required finish. The coatings may be dried at room temperature or forced dried at a temperature of between 100-110° F. Although additional coats are necessary, the use of the lacquer effects an economy in production due to the rapid drying of the material. So-called spirit soluble resins as shellac are often used to produce finishes on certain types of products. Synthetic resins such as the oil modified alkyd resins are used as finish coats in the same general system and these compositions may or may not be pigmented. Of the finishing systems which are in common use those giving the most desired results are tedious to operate and consequently rather expensive.

In our Patent 2,201,914, we have disclosed an improved finishing composition comprising a urea-formaldehyde alcohol resinous material, a plasticizer, and a fossil resinous material. This composition requires a much smaller amount of sealer composition than those mentioned above and in addition possesses several additional advantages. Further improvements in lowered cost, color, and clarity of film, are however desirable. It is to be observed that but few types of resins can be used successfully with the mentioned urea resin for the present purpose, and in fact we have so far found in our experiments but one additional specific resin, namely, that used in the practice of this invention, which will yield a composition comparable to that described in the mentioned application.

The urea-formaldehyde-monohydric alcohol resin referred to above which is obtained by the special procedure described in the mentioned patent contains alcohol in combined form from about one-half to about one molecule of urea, and the resin yields upon treatment with zinc chloride and acetic anhydride the acetate of the alcohol.

This invention has as an object a new composition for finishing surfaces. A further object is a finishing system which may be produced more economically than that described in the above mentioned patent and which is improved with respect to color and clarity of film. Further objects are a composition for finishing surfaces which will produce a finish having a high luster, will possess improved print resistance, increased resistance to alcohol and to water, will have increased depth of luster and produce a film which is tough and wear resistant and possess increased speed of drying. Other objects will appear hereinafter.

These objects are accomplished by the use of compositions comprising the previously described urea-formaldehyde-alcohol resinous material, a plasticizer and a maleic anhydride rosin modified alkyd type resin.

A preferred method for carrying out our invention is shown by the following example in which the parts are by weight:

| | Parts |
|---|---|
| Urea-formaldehyde-alcohol resin (55% solids) | 43.30 |
| Maleic anhydride-rosin modified alkyd resin solution | 23.85 |
| Pale blown castor oil | 11.92 |
| Isobutyl alcohol | 7.16 |
| High solvency petroleum hydrocarbon | 10.33 |
| Octyl alcohol | 2.00 |
| Phosphorous pentoxide solution | 1.44 |

This composition contains on a solids basis approximately 50% urea-formaldehyde-alcohol resin, 25% maleic anhydride rosin modified alkyd resin and 25% plasticizer. The composition has the following physical characteristics: viscosity E (Gardner Holt scale), color 3.4 by Hellige Color Comparator, specific gravity 0.965 at 25° C., and solids content of approximately 48%.

The maleic anhydride-rosin modified resin is obtained by reacting maleic anhydride, or maleic acid, and rosin in substantial amount with glycerol. The proportions by weight on the basis of these three essential ingredients are usually within 5% to 25% maleic anhydride, and 3% to 16% glycerol, the balance being rosin. A typical resin is that obtained from 25% maleic anhydride, 59% rosin, and 16% glycerol. The maleic anhydride can be replaced by the corresponding acid, and rosin by the natural resin acids derived therefrom. These resins may be obtained under such trade names as Z-152 Teglac, 801 Amberol, 1111 Beckacite, etc. The resin solution used in the example is prepared by dissolving 50 parts by weight of the solid resin in an equal weight of high solvency petroleum naphtha with or without the aid of heat. The solution is then adjusted to as nearly as practical 50% solids content by the addition if necessary of the high solvency petroleum naphtha.

In place of the pale blown castor oil, other plasticizers may be used such as an extracted blown linseed oil known as Colloxin; blown linseed oil; magnesium treated cocoanut oil; hydrogenated castor oil phthalate; glycol, polyglycol, glycerol and polyglycerol esters of straight chain dicarboxylic acids as adipic, azelaic, succinic acid, etc.; chlorinated diphenyls; hydrogenated castor oil modified alkyd resin, linseed oil-China-wood oil modified alkyd resin as well as other fatty oil or fatty oil acid modified alkyds, etc.

The glycerol may be replaced by other polyhydric alcohols, such as sorbitol, pentaerythritol, etc., which are known to be useful in making alkyd resins.

In place of the high solvency petroleum naphthas (which are usually hydrogenated petroleum hydrocarbons) there may be used aromatic hydrocarbons as benzol, toluol, etc., denatured ethyl alcohol, methanol, isobutyl alcohol, octyl alcohol, monoalkyl ethers of ethylene glycols and their esters, terpene hydrocarbon solvents, etc. The choice of the solvents will be readily apparent to those skilled in the art of preparing and using finishing compositions as described in the present invention and will be governed by conditions of application, economic factors, etc.

It has been found that the use of small percentages of the higher boiling alcohols as e. g. octyl alcohol with the high solvency petroleum hydrocarbon improves the flow of the composition and results in the production of a smooth surfaced coating substantially free from imperfections that might be caused by bubbling of the solvent during the initial stages of the drying of the finishing composition.

In place of the phosphorous pentoxide as an accelerator for drying the composition, orthophosphoric acid, phthalic anhydride or oxalic acid may be used. These materials are preferably dissolved in a suitable alcohol although they may be added as such to the composition. The amount of accelerator used may conveniently vary between 0.25 and 5.0% based on the urea-formaldehyde-alcohol resin content of the composition.

In using the compositions as a finishing coat on, for example, wood, the surface is stained and filled and then a thin coating of sealer applied. With the compositions of the present invention it is necessary to apply only about one-half the amount of sealer ordinarily used. After the sealer has been applied the finish composition is applied, preferably sprayed, in an amount sufficient to suitably cover the surface. The material is then placed in an oven and force dried at a temperature between 130 and 140 F. for a period of from 2–6 hours. It is then removed from the oven and cooled to room temperature after which the surface is rubbed and polished according to conventional procedures. Variations in the latter procedures will be readily apparent to those skilled in the finishing art and may be made to produce the degree of luster in the finish that may be desirable.

The range on a solid basis in the percentages of film forming ingredients in the preferred composition is for the urea-formaldehyde-alcohol resin 10–75%, for the plasticizer 10–50% and for the maleic anhydride rosin modified alkyd 10–50%.

The finishing compositions may be used on metal, being applied over color coats or graining coats of pigmented standard finishes composition as orthodox compositions, synthetic resin compositions, etc. The finish may be conveniently baked for from 1–3 hours at 200–300° F. the time and temperature varying with the type of material being finished, type of finish desired, conditions available, etc.

It will be apparent from the description of the invention that we have developed a finishing system for wood, metal and other surfaces involving the use of a finish coat composition which produces a finish having a high luster, improved depth of luster which enhances the appearance of the grain in the wood, markedly improves alcohol and water resistance, improved print resistance and markedly improved toughness of film over the finishes now in common use. Further, since a smaller amount of sealer composition is necessary and since the finishing compositions may be dried and hardened in a much shorter time the system effects economic advantages over the best systems in the present state of the art. In addition the improved compositions possess a paler color, greater clarity and a lower bulk cost than the compositions prepared with a fossil resin or modified fossil resin.

As many apparently widely different embodiments of this invention may be made without departing from the spirit and scope thereof, it is to be understood that we do not limit ourselves to the specific embodiments thereof except as defined in the appended claims.

We claim:

1. A finishing composition comprising 10 to 50% plasticizer, 10 to 75% of the resinous reaction product of urea, formaldehyde and monohydric alcohol, and 10 to 50% of the resinous reaction product of ingredients consisting essentially of a maleic compound of the class consisting of maleic anhydride and maleic acid, glycerol and a modifying ingredient of the class consisting of rosin and the natural resin acids derived therefrom, the maleic compound on the basis of maleic anhydride constituting about 5 to 25% by weight of said ingredients, the glycerol about 3 to 16%, and the modifying ingredient on the basis of rosin constituting the remainder, said resinous reaction product of urea, formaldehyde, and monohydric alcohol containing said alcohol in combined form in amount of from one-half to about one molecule of alcohol for each molecule of urea, said last named resinous reaction product yielding upon treatment with zinc chloride and acetic anhydride the acetate of said alcohol.

2. The finishing composition defined in claim 1 in which the plasticizer comprises about 25%, the resinous reaction product of urea, formaldehyde and monohydric alcohol about 50%, and the resinous reaction product of said maleic compound, glycerol and said modifying ingredient about 25%.

3. An article of manufacture having a surface coating thereon which comprises the composition set forth in claim 1.

EDMUND F. OEFFINGER.
HARRY G. STAUFFER.